United States Patent [19]

Kagerer

[11] Patent Number: 4,674,908
[45] Date of Patent: Jun. 23, 1987

[54] MECHANISM FOR CLAMPING A SECOND MACHINE PART WHICH IS SUPPORTED MOVABLY WITH RESPECT TO A FIRST MACHINE PART

[75] Inventor: Franz Kagerer, München, Fed. Rep. of Germany

[73] Assignee: Friedrich Deckel Aktiengesellschaft, München, Fed. Rep. of Germany

[21] Appl. No.: 768,000

[22] Filed: Aug. 21, 1985

[30] Foreign Application Priority Data

Aug. 24, 1984 [DE] Fed. Rep. of Germany ....... 3431213

[51] Int. Cl.[4] .......................... B23Q 1/28; F16D 1/12
[52] U.S. Cl. .................................... 403/109; 403/377; 403/381; 403/356; 403/362; 269/93; 29/1 A; 409/231
[58] Field of Search .............. 403/377, 381, 362, 366, 403/356, 374, 375, 109, 110, 104, 330, DIG. 8, 331, 322; 409/231, 204, 214; 29/1 A; 269/93

[56] References Cited

U.S. PATENT DOCUMENTS

| 744,559 | 11/1903 | Kendrick | 269/93 X |
|---|---|---|---|
| 1,649,895 | 11/1927 | Gade | 403/362 X |
| 2,281,482 | 4/1942 | Crayton | 269/93 X |
| 2,336,044 | 12/1943 | Stuart | 403/331 X |
| 2,681,152 | 6/1954 | Stindt | 403/362 X |
| 3,708,243 | 1/1973 | Wooden | 403/362 X |
| 3,913,192 | 10/1975 | Baumer et al. | 409/231 X |
| 4,033,010 | 7/1977 | McCalla | 403/331 X |
| 4,215,961 | 8/1980 | Babel | 409/231 |
| 4,335,499 | 6/1982 | Prat | 29/1 A |

FOREIGN PATENT DOCUMENTS

| 1247809 | 8/1967 | Fed. Rep. of Germany . | |
| 2644178 | 6/1978 | Fed. Rep. of Germany . | |
| 1334524 | 7/1963 | France | 269/93 |
| 379885 | 8/1964 | Switzerland | 269/93 |
| 2127515 | 4/1984 | United Kingdom | 403/377 |

OTHER PUBLICATIONS

Machinery, 1949, p. 186, Double-Action Clamping Device by F. Server.

Primary Examiner—Cornelius J. Husar
Assistant Examiner—Todd G. Williams
Attorney, Agent, or Firm—Flynn, Thiel, Boutell & Tanis

[57] ABSTRACT

We are dealing with a mechanism for clamping a second machine part 4 which is supported movably with respect to a first machine part 2. A clamping bar 28, which extends in the direction of movement is arranged on the second machine part 4, on which clamping bar can be clamped a clamping member 32 which is supported freely movably in directions transverse to the direction of movement of the first machine part, but otherwise clearance free. Since the clamping member 22 is as a whole freely movable in directions transverse to the direction of movement, no reactive forces whatsoever are created in the direction of movement during the clamping operation.

The inventive clamping mechanism is preferably used in feed-movable spindle sleeves (tail spindles) in order to assure a secure clamping in an axial direction and in a peripheral direction, without producing forces which act transversely to the spindle axis.

4 Claims, 6 Drawing Figures

MECHANISM FOR CLAMPING A SECOND MACHINE PART WHICH IS SUPPORTED MOVABLY WITH RESPECT TO A FIRST MACHINE PART

FIELD OF THE INVENTION

This invention relates to a mechanism cooperable with first and second machine parts which are movable relative to each other for clamping the second machine part against movement with respect to the first machine part, including clamping surfaces which are constructed on a guide surface provided on the second machine part facing the first machine part, and which extend parallel to the direction of movement, and including a clamping member which is held on the first machine part against movement parallel to the direction of movement and which can be clamped against the clamping surfaces of the second machine part. The clamping mechanism has the purpose to hold the machine part in every adjusted position, wherein it is demanded that the position of the machine part be changed as little as possible by the clamping operation. In particular, the request often exists that no forces be applied perpendicular to the guide surface by the clamping mechanism.

BACKGROUND OF THE INVENTION

Mechanisms of this type are used for example for clamping machine-tool carriages or for the feed of movable spindle sleeves of machine tools. In machine-tool carriages, a clamping force which acts perpendicular to the guide surface often leads to an undesired deformation of the carriage in the clamping region; in spindle sleeves, there results also an undesired deformation and a spindle deflection to the side. Most of all, in the case of spindle sleeves of modern, very precise machine tools, the clamping mechanism is supposed to hold the spindle sleeve and thus the tool spindle which is supported in said spindle sleeve securely in every axial position, without the clamping operation causing a change in the axial and radial adjustments and the adjustment of the spindle sleeve in a peripheral direction.

A clamping mechanism of this type is already known for the spindle sleeve of a machine tool in which the clamping member is arranged approximately tangentially with respect to the spindle sleeve and, with two clamping pieces which are movable relative to one another, clamps a clamping bar which is constructed on the spindle sleeve (German Patent No. 2 644 178). For reasons of a simple manufacture, the clamping pieces are cylindrical and are supported movably in a corresponding round bore in the wall of the spindle housing. Already a small lateral clearance of the clamping member in the round bore has the result that the spindle sleeve can rotate a certain amount. A further disadvantage is seen in the fact that, through wear or deformation of the clamping surfaces of the clamping bar or of the clamping pieces, forces occur perpendicular to the guide surface, that is, perpendicular with respect to the spindle axis. Since the clamping member cannot give way in this direction, the spindle sleeve is loaded in a radial direction, which is particularly disadvantageous for the exactness of the spindle. Furthermore, the possible circular-segment-shaped clamping surface of the clamping pieces is only relatively small in this construction so that, for a pregiven permissible surface pressure, only relatively small clamping forces can be produced.

A purpose of the present invention is to provide a mechanism of the above type which permits a substantially reaction-free clamping of the machine part and produces a high clamping force while having a simple method of construction.

SUMMARY OF THE INVENTION

This purpose is attained inventively by providing that the clamping member is supported freely movably in directions substantially perpendicular to the guide surface on the second machine part.

The clamping member is supported freely movably in directions substantially perpendicular to the guide surface of the machine part which is to be clamped. Through this, the clamping acts reaction-free in every case in a direction perpendicular to the guide surface, so that a deformation or a shift in this direction cannot occur. Furthermore, it is possible through the inventive arrangement, compared with the known arrangement with approximately the same dimensions of the clamping pieces, to considerably increase the available clamping surface, so that for a pregiven maximum permissible surface pressure, a higher clamping force is possible. The exactness of the clamping depends directly on the exactness of the support of the clamping member without the occurrence of an inexactness due to a translation effect of the arrangement.

A preferred development of the invention provides that the clamping member includes a first clamping part which can be placed against the guide surface of the second machine part and a second clamping part which is supported against the first clamping part, the second clamping part gripping behind undercut surfaces constructed on the second machine part. For clamping, the first clamping part is pressed against the guide surface; since it is supported against the other clamping part, same is pressed simultaneously against the undercut surfaces, so that the clamping member is connected fixedly to the machine part which is to be clamped. Since the region of the guide surface which the first clamping part rests against is also utilized as a clamping surface, a significant enlargement of the clamping surface which is available as a whole results in comparison with the known solution.

In a preferred exemplary embodiment of the invention, there is a clamping part constructed as a sleeve which is supported movably in a bore of the first machine part, which bore is perpendicular with respect to the guide surface of the second machine part, the other clamping part being a bolt which is arranged in a bore extending through the sleeve and provided with a thread. The clamping parts, which can be manufactured as turned parts, are simple and inexpensive.

A further development of the invention provides that a clamping bar which has a dovetail-shaped, outwardly enlarging cross section and which extends in the direction of movement is constructed on the second machine part, that the sleeve has at its end which faces the clamping bar a profile which form-lockingly grips around the clamping bar, and that between the bolt and the clamping bar there is provided a clamping piece which is supported longitudinally movably and nonrotatably in the bore and rests against the front surface of the clamping bar. Particularly in a clamping mechanism for clamping a spindle sleeve, in which the front surface of the clamping bar is curved cylindrically, it is thereby provided that the clamping piece has a bearing surface which is complementary with respect to the front surface, so that, in order to increase the effective clamping surface, it rests flatly thereon.

The bolt is provided with an operating handle at its end which does not face the clamping bar.

In an exemplary embodiment which serves in particular for clamping a spindle sleeve arranged movably in a spindle housing, including clamping surfaces which extend along generetrix lines of the spindle sleeve, it is provided inventively that the clamping member is supported radially freely movably with respect to the spindle-sleeve axis in the wall of the spindle housing.

BRIEF DESCRIPTION OF THE DRAWINGS

Several exemplary embodiments of the invention are illustrated in the drawings and will be described in greater detail hereinafter.

In the drawings.

DETAILED DESCRIPTION

Figure 1:
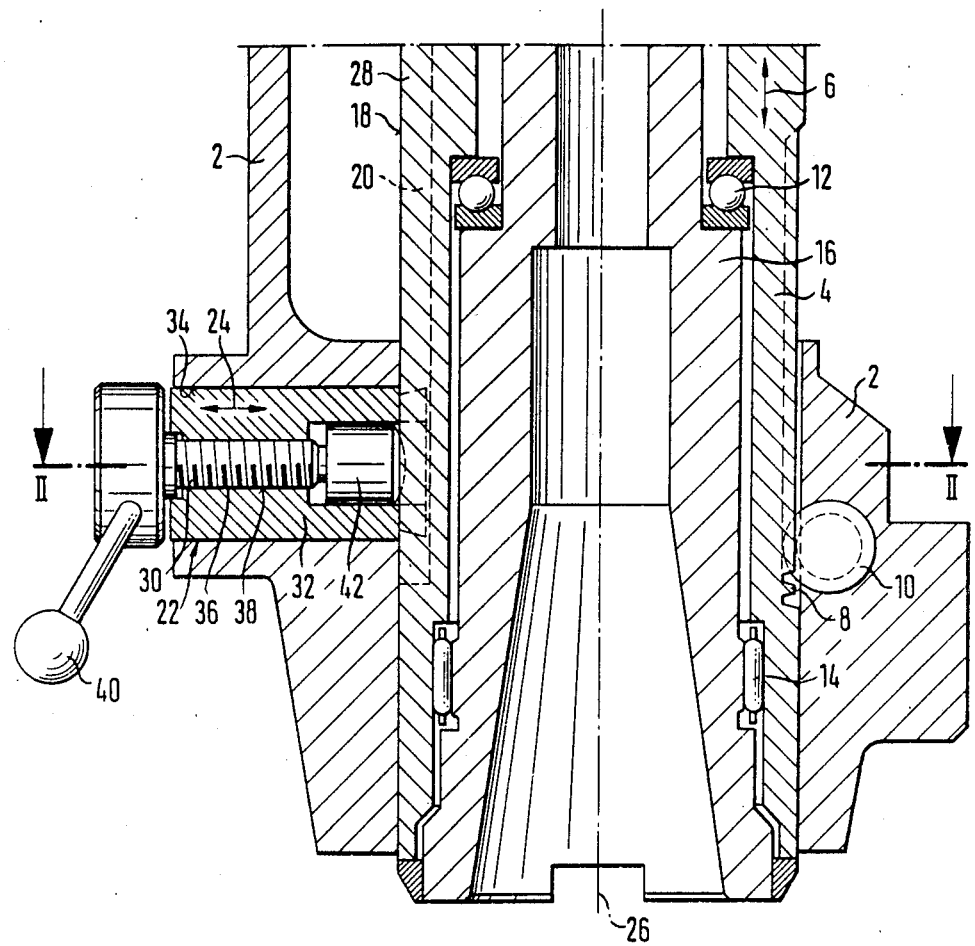
FIG. 1 is a longitudinal cross-sectional view of a feed-movable spindle sleeve with a clamping mechanism, which spindle sleeve is arranged in a spindle housing.

The first machine part 2, which is illustrated in FIG. 1, is a spindle housing in which a spindle sleeve is, as a second machine part 4, supported feed-movably in direction indicated by the arrow 6. The spindle sleeve 4 has on its outside a tooth system 8 for the feed drive, into which engages a pinion 10 connected to a feed drive, a crank or the like. A machine-tool spindle 16 is supported rotatably in a conventional manner in the spindle sleeve 4 by bearings 12, 14. The machine-tool spindle 16 is provided in a conventional manner with a spindle drive which is not described here in detail.

The surface of the spindle sleeve serves as a guide surface 18 for guiding the spindle sleeve 4 in the spindle housing 2. Clamping surfaces 20 which extend in the direction of movement are constructed in the region of the guide surface 18, which region faces to the left in FIG. 1, which clamping surfaces will be described in greater detail in connection with FIG. 2. A clamping member which as a whole is identified with reference numeral 22 can be clamped to the clamping surfaces, which clamping member is, on the one hand freely movable in the direction of the arrow 24, but is otherwise supported clearance-free in the spindle housing 2.

The clamping member 22 can be fixedly clamped on the clamping surfaces 20 for clamping the spindle sleeve 4 in the spindle housing 2. Because of the free movability of the clamping member 22 in the direction of the arrow 24, no force whatsoever occurs during the clamping operation in directions transverse with respect to the spindle axis 26, while the spindle sleeve 4 is held clearance-free, that is, with a close tolerance fit, in an axial direction and in a peripheral direction.

Figure 2:
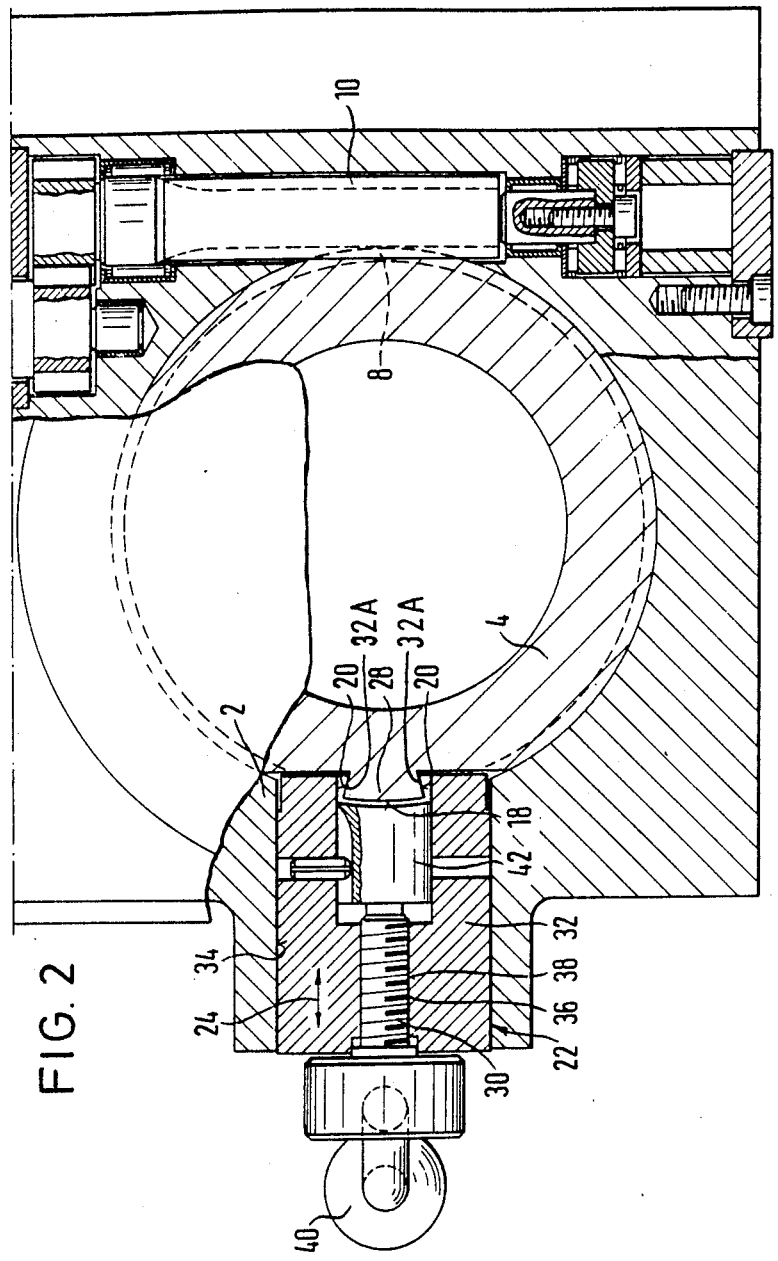
FIG. 2 is a cross-sectional view of the mechanism according to FIG. 1 taken along the line II—II.

FIG. 2 illustrates the arrangement according to FIG. 1 in a cross section, whereby the same parts are identified with the same reference numerals. To form the clamping surfaces 20, a clamping bar 28 which extends in the direction of movement and which has a dovetail-shaped, outwardly enlarging cross section is machined into the surface of the spindle sleeve 4 which serves as the guide surface 18. The clamping surfaces 20 thus form undercut surfaces which the clamping member 22 can engage. The second clamping part 32 has surfaces 32A conforming to the clamping surfaces 20. The clamping member 22 consists of a first clamping part 30 which can be placed against the front or guide surface of the spindle sleeve and a second clamping part 32 which is supported against the first clamping part and the surfaces 32A grip behind the undercut surfaces. As can be recognized from FIG. 2, 4, 5 and 6 the second clamping part 32 is constructed as a sleeve which is supported movably in a bore 34 of the spindle housing 2, and the first clamping part 30 is a bolt which is arranged in a bore 38 which extends coaxially through such sleeve and is provided with a thread 36. The sleeve 32 has at its end which faces the spindle sleeve 4 a shape, namely, the surfaces 32A which form-lockingly grip around the clamping bar 28. The bolt 30 is, to effect clamping, screwed into the sleeve 32 by means of an operating handle 40 which is arranged on the bolt 30. The inner end of the bolt 30 engages the front surface of the clamping bar 28 to, in turn, urge the sleeve 32 away from the spindle sleeve 4. The surfaces 32A of the sleeve 32 are caused to rest against the clamping surfaces 20, so that the clamping member 22 tightly and nonmovably engages the clamping bar. In order to obtain a friction surface between the bolt 30 and the outside of the spindle sleeve 4 which is as large as possible, a clamping piece 42 with a profile which is complementary to the front surface of the clamping bar 28 is arranged between the bolt 30 and the spindle sleeve 4.

After releasing the clamping member 22 from gripping the clamping bar 28, it is possible to move the spindle sleeve 4 by means of the pinion 10 which engages the tooth system 8, which does not need to be explained in greater detail.

Figure 3:
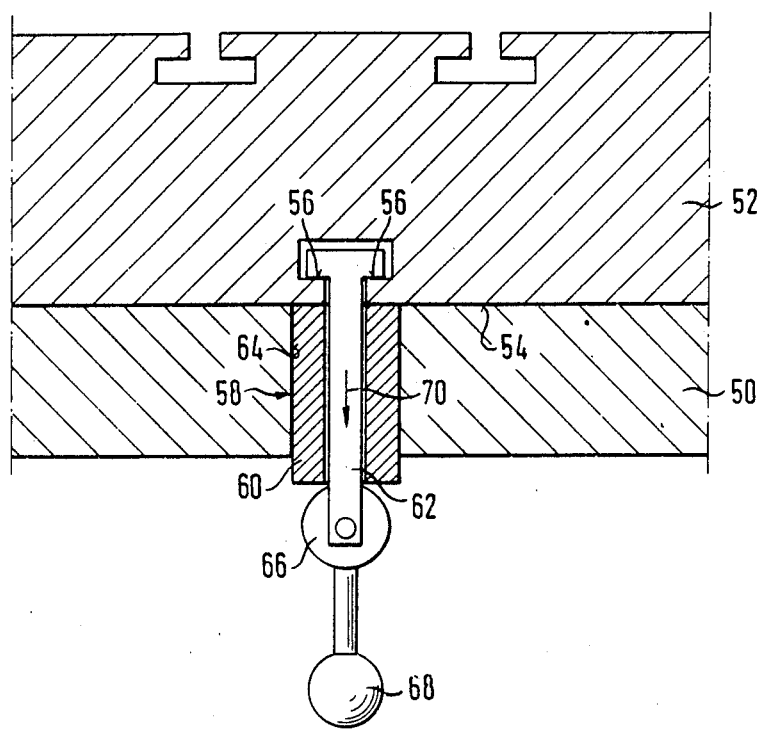
FIG. 3 illustrates diagrammatically a different exemplary embodiment of a clamping mechanism for a movable machine carriage.
Figure 4:
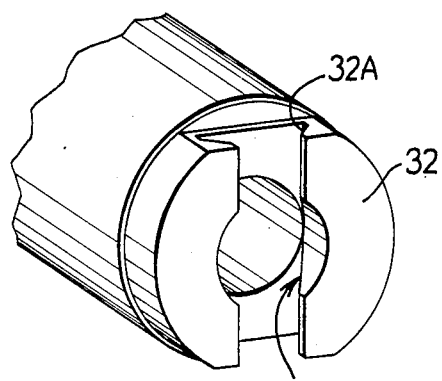
FIG. 4 is a perspective view of a clamping part.
Figure 5:
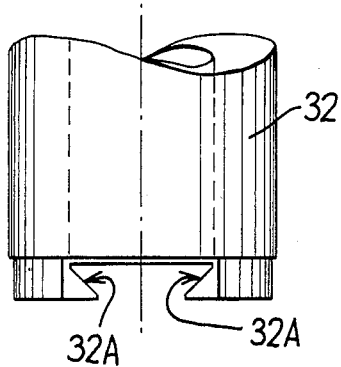
FIG. 5 is a side view of the clamping part rotated 90° from the illustration in FIG. 1.
Figure 6:
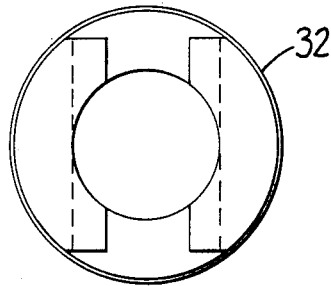
FIG. 6 is an end view of the clamping part.

FIG. 3 illustrates diagrammatically an exemplary embodiment in which the first machine part 50 is formed by a machine frame and the second machine part 52 by a carriage which is movable relative thereto in directions perpendicular to the drawing plane. The surface of the carriage 52 which rests on the machine frame 50 serves as a guide surface 54. A T-groove or in other words a T-shaped groove, is machined into such guide surface, and the lower horizontal surfaces of the T-groove serve as clamping surfaces 56. The clamping member, which as a whole is identified with reference numeral 58, consists in turn of a first clamping part 60 which can be placed against the guide surface 54 of the machine carriage and a second clamping part 62 which is supported thereon and which grips behind the clamping surfaces 56. The first clamping part is in this case constructed as a sleeve which is supported movably in a bore 64 of the machine frame, and the second clamping part is a bolt which is movable in a bore which extends coaxially through the sleeve. In the present exemplary embodiment, the bolt 62 can be pulled outwardly in the direction of the arrow 70, for example by an eccentric 66 rotated by means of a handle 68, whereby the head of the bolt 62 engages the clamping surfaces 56, while at the same time the sleeve 60 is pressed against the guide surface 54.

Also in this case, the clamping in directions perpendicular to the guide surface 54 is completely reaction-free, since the clamping member 58 can as a whole move freely in directions perpendicular to the guide surface 54.

The embodiments of the invention in which an exclusive property or privilege is claimed are defined as follows:

1. A clamping device, comprising:

a first machine part having first guide surface means thereon;

a second machine part having second surface means thereon operatively supported on said first guide surface means for facilitaitng a relative movement between said first and second machine parts in a first direction;

elongated first and second clamping surface means on said second machine part extending in said first direction;

means defining a first opening in said first machine part, the axis of which extends perpendicular to said first direction;

a clamping sleeve having means defining a second opening therethrough, said clamping sleeve being freely slidably received in said first opening and for movement in both axial directions thereof, said first opening having a close tolerance fit around said clamping sleeve, said clamping sleeve having a third clamping surface means thereon opposing said second clamping surface means;

a clamping bolt axially movably received in said second opening and having a fourth clamping surface means slidingly engaging said first clamping surface means;

means for effecting a relative axial movement between said clamping bolt and said clamping sleeve in opposite directions perpendicular to said first direction to cause said first and fourth clamping surface means to be urged into a tight clamping engagement with one another and said second and third clamping surface means to be urged into a tight clamping engagement with one another without causing an application of an interacting force between said first and second machine parts, said second and third clamping surface means being defined by an elongated dovetail-shaped section, said third clamping surface means being defined by a first pair of inclined surfaces facing away from said second machine part, said second clamping surface means being located intermediate said first pair of inclined surfaces and facing toward said third clamping surface means;

said second clamping surface means being defined by a second pair of inclined surfaces and opposing said first pair of inclined surfaces; and said fourth clamping surface means being defined by an end structure on said clamping bolt having a surface opposing said first clamping surface means.

2. The clamping device according to claim 1, wherein said end structure includes a clamping piece separate from said clamping bolt and has a bearing surface conforming to said first clamping surface means.

3. The clamping device according to claim 1, wherein said means for effecting a relative axial movement includes said second opening being an externally threaded hole and said clamping bolt being an externally threaded bolt threadedly coupled in said internally threaded hole.

4. The clamping device according to claim 3, further including a handle means secured to said clamping bolt for facilitating a rotating of said clamping bolt.

* * * * *